US007957665B2

(12) United States Patent
Day et al.

(10) Patent No.: US 7,957,665 B2
(45) Date of Patent: Jun. 7, 2011

(54) DUAL-RANGE POWER SUPPLY FOR AN IMAGE FORMING DEVICE

(75) Inventors: Michael Charles Day, Lexington, KY (US); William Paul Cook, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 625 days.

(21) Appl. No.: 11/848,659

(22) Filed: Aug. 31, 2007

(65) Prior Publication Data

US 2009/0060556 A1 Mar. 5, 2009

(51) Int. Cl.
*G03G 15/00* (2006.01)
*G03G 15/06* (2006.01)
*H02J 1/00* (2006.01)

(52) U.S. Cl. ................ 399/88; 399/37; 399/55; 307/61; 307/63; 307/75

(58) Field of Classification Search .................... 399/88, 399/89, 90, 43, 66, 55; 363/63, 78; 323/205; 307/43, 61, 71, 75
See application file for complete search history.

(56) References Cited

U.S. PATENT DOCUMENTS 3,950,680 A * 4/1976 Michaels et al. .............. 361/229
4,077,709 A * 3/1978 Borostyan et al. .............. 399/66
4,190,348 A * 2/1980 Friday ........................... 399/314
5,773,822 A * 6/1998 Kitamura et al. ............. 250/281
6,549,733 B2 * 4/2003 Matsuguma .................... 399/26
6,845,220 B2 * 1/2005 Lee ................................ 399/38
7,050,732 B2 * 5/2006 Bae et al. ........................ 399/50
2006/0091916 A1 * 5/2006 Uchiyama et al. ............ 327/108

* cited by examiner

*Primary Examiner* — David M Gray
*Assistant Examiner* — Francis Gray

(57) ABSTRACT

The embodiments disclosed herein are directed to methods and devices for a control system to regulate the output voltage of a high voltage power supply (HVPS) in an image forming device. In one embodiment, the HVPS comprises at least two voltage sources connected in series. A print engine controller is configured to disable at least one of the voltage sources when a voltage draw of a load exceeds a maximum differential voltage of the at least two voltage sources.

16 Claims, 3 Drawing Sheets

DUAL-RANGE POWER SUPPLY FOR AN IMAGE FORMING DEVICE

BACKGROUND

The present application relates generally to an image forming device, and more specifically to regulating the output voltage of a high voltage power supply in the image forming device.

The electrophotography process used in some image forming devices, such as laser printers and copiers, utilizes electrical potentials between components to control the transfer and placement of toner. These electrical potentials create attractive and repulsive forces that promote the transfer of charged toner to desired areas while ideally preventing transfer of the toner to unwanted areas. For instance, during the process of developing a latent image on a photoconductive surface, toner particles may be deposited onto latent image features (e.g., corresponding to text or graphics) on the photoconductive surface having a lower surface potential than the charged particles.

The image forming device may include four image forming units associated with four colors: cyan, magenta, yellow, and black. Each image forming unit includes an optical source that is scanned to produce a latent image on the charged surface of the photoconductive unit. Each image forming unit may also include a transfer roller charged to an opposite polarity than the photoconductive unit. The transfer rollers may require a separate power supply capable of adjusting an output voltage.

As new and/or updated models of image forming devices are developed, it may be advantageous to reuse a power supply from a previous model to lower costs and decrease engineering resource needs. However, new models often include higher print speed and print quality than their predecessors, which may dictate the need for higher transfer voltages. The higher transfer voltages may tax or even exceed the output of the power supplies of the previous models, limiting the ability to reuse these power supplies.

SUMMARY

The embodiments disclosed herein are directed to methods and devices for a control system to regulate the output voltage of a high voltage power supply (HVPS) in an image forming device. In one embodiment, the HVPS comprises at least two voltage sources connected in series. A print engine controller is configured to disable at least one of the voltage sources when a voltage draw of a load exceeds a maximum differential voltage of the at least two voltage sources. In one embodiment, the HVPS is a component of an existing circuit design, and the control system modifies the existing circuit design for use in an alternate application.

DETAILED DESCRIPTION

The embodiments disclosed herein are directed to methods and devices for a control system to regulate the output voltage of a high voltage power supply (HVPS) in an image forming device. In one embodiment, the HVPS comprises at least two voltage sources connected in series. A print engine controller is configured to disable at least one of the voltage sources when a voltage draw of a load exceeds a maximum differential voltage of the at least two voltage sources. In one embodiment, the HVPS is a component of an existing circuit design, and the control system modifies the existing circuit design for use in an alternate application.

Figure 1:
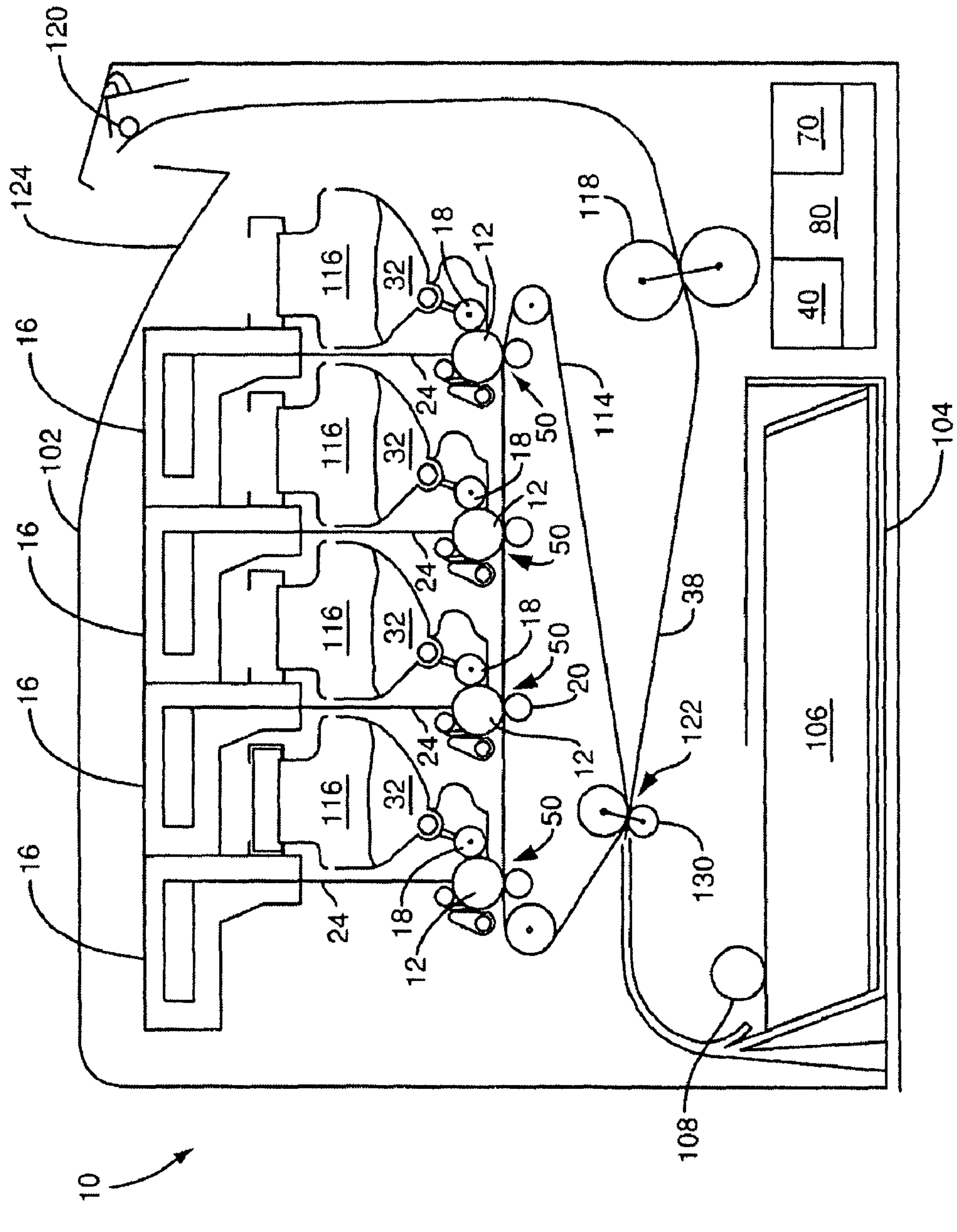
FIG. 1 is a schematic diagram of an image forming device according to one embodiment.

The HVPS control system may be implemented in a device such as the image forming device 10 generally illustrated in FIG. 1 and may be implemented with various embodiments disclosed herein. The image-forming device 10 comprises a housing 102 and a media tray 104. The media tray 104 includes a stack of media sheets 106 and a sheet pick mechanism 108.

Within the image-forming device housing 102, the image-forming device 10 includes one or more removable developer cartridges 116, photoconductive units 12, developer rollers 18 and corresponding transfer rollers 20. The image forming device 10 also includes an intermediate transfer mechanism (ITM) belt 114, a fuser 118, and exit rollers 120. Additionally, the image-forming device 10 includes a print engine controller 80 comprising controllers, microprocessors, DSPs, or other stored-program processors (not specifically shown in FIG. 1) and associated computer memory, data transfer circuits, and/or other peripherals (not shown) that provide overall control of the image formation process. In one embodiment, the print engine controller 80 may further include a power supply 40 for the photoconductive units 12 and a power supply 70 for the transfer rollers 20, described in greater detail below. In one embodiment, either of the power supplies 40, 70 may be implemented separate from the print engine controller 80.

Each developer cartridge 116 may include a reservoir containing toner 32 and a developer roller 18. Each developer roller 18 is adjacent to a corresponding photoconductive unit 12, with the developer roller 18 developing a latent image on the surface of the photoconductive unit 12 by supplying toner 32. In a typical color image forming device, three or four colors of toner—cyan, yellow, magenta, and optionally black—are applied successively (and not necessarily in that order) to an ITM belt 114 or to a media sheet 106 to create a color image. Correspondingly, FIG. 1 depicts four image forming units 50. In a monochrome printer, only one forming unit 50 may be present.

The operation of the image forming device 10 is conventionally known. Upon command from control electronics, a single media sheet 106 is "picked," or selected, from the media tray 104 while the ITM belt 114 moves successively past the image forming units 50. As described above, at each photoconductive unit 12, a latent image is formed thereon by optical projection from the imaging device 16. The latent image is developed by applying toner to the photoconductive unit 12 from the corresponding developer roller 18. The toner is subsequently deposited on the ITM belt 114 as it is conveyed past the photoconductive unit 12 by operation of a transfer voltage applied by the transfer roller 20. The media sheet 106 is fed to a secondary transfer nip 122 where the image is transferred from the ITM belt 114 to the media sheet 106 with the aid of a transfer roller 130. The media sheet proceeds from the secondary transfer nip 122 along media path 38. The toner is thermally fused to the media sheet 106 by the fuser 118, and the sheet 106 then passes through the exit rollers 120 onto an output tray 124.

The representative image forming device 10 shown in FIG. 1 is referred to as a dual-transfer device because the developed images are transferred twice: first to the ITM belt 114 at the image forming units 50 and second to the media sheet 106 at the transfer nip 122. Other image forming devices implement a single-transfer mechanism where the media sheet 106 is transported by a transport belt (not shown) past each image-forming unit 50 for direct transfer of toner images onto the media sheet 106. The power supplies 40, 70 disclosed herein may be used for either type of image forming device.

Figure 2:
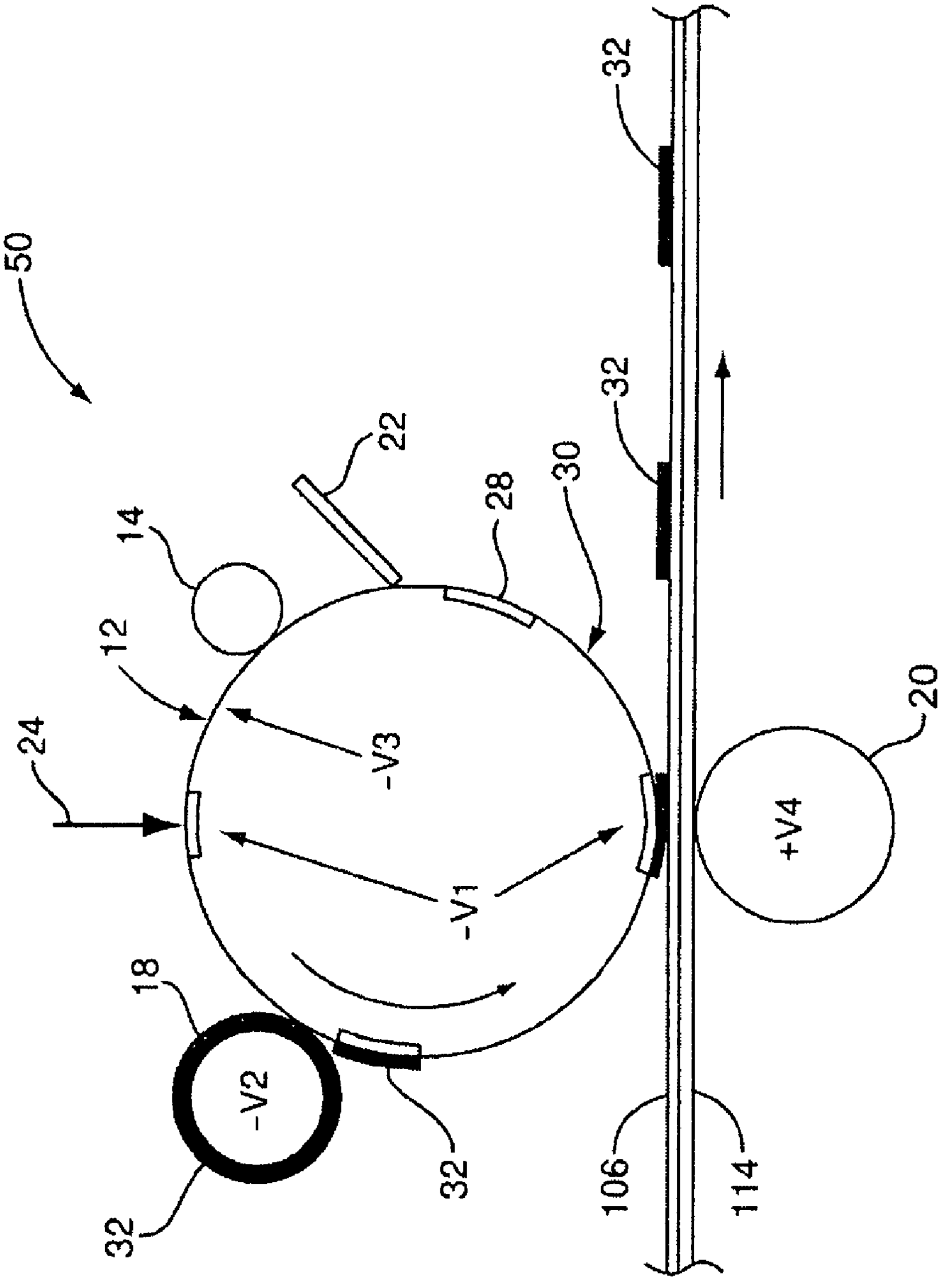
FIG. 2 is a schematic diagram of an image forming unit according to one embodiment.

FIG. 2 illustrates an embodiment of the image forming unit 50. Each image forming unit 50 includes the photoconductive unit 12, a charging unit 14, the imaging device 16, the developer roller 18, the transfer roller 20, and a cleaning blade 22. The photoconductive unit 12 is cylindrically shaped and illustrated in cross section. However, it will be apparent to those skilled in the art that the photoconductive unit 12 may comprise any appropriate shape or structure, including but not limited to belts or plates. The charging unit 14 charges the surface of the photoconductive unit 12 to a potential identified as −V3. A laser beam 24 from a source, such as a laser diode, in the imaging device 16 selectively discharges discrete areas 28 on the photoconductive unit 12 to form a latent image on a surface of the photoconductive unit 12. The energy of the laser beam 24 selectively discharges these discrete areas 28 of the surface of the photoconductive unit 12 to a lower potential identified as −V1. Areas of the latent image not to be developed by toner (also referred to as "white" or "background" image areas) are indicated generally by the numeral 30 and retain the potential −V3 induced by the charging unit 14.

The latent image thus formed on the photoconductive unit 12 is then developed with toner 32 from the developer roller 18, on which is adhered a thin layer of toner 32. The developer roller 18 is biased to a potential −V2 that is intermediate to the surface potential −V1 of the discharged latent image areas 28 and the surface potential −V3 of the undischarged areas not to be developed 30. As is well known in the art, the photoconductive unit 12, developer roller 18 and toner 32 may be charged alternatively to positive voltages.

In this manner, the latent image on the photoconductive unit 12 is developed by the toner 32, which is subsequently transferred to the media sheet 106 by the positive voltage +V4 of the transfer roller 20. Alternatively, the toner 32 developing an image on the photoconductive unit 12 may be transferred to an ITM belt 114 and subsequently transferred to the media sheet 106 at a second transfer location (not shown in FIG. 2, but see location 122 in FIG. 1). After the developed image is transferred off the photoconductive unit 12, the cleaning blade 22 removes any remaining toner 32 from the photoconductive unit 12, and the photoconductive unit 12 is again charged to a uniform level by the charging device 14.

Figure 3:
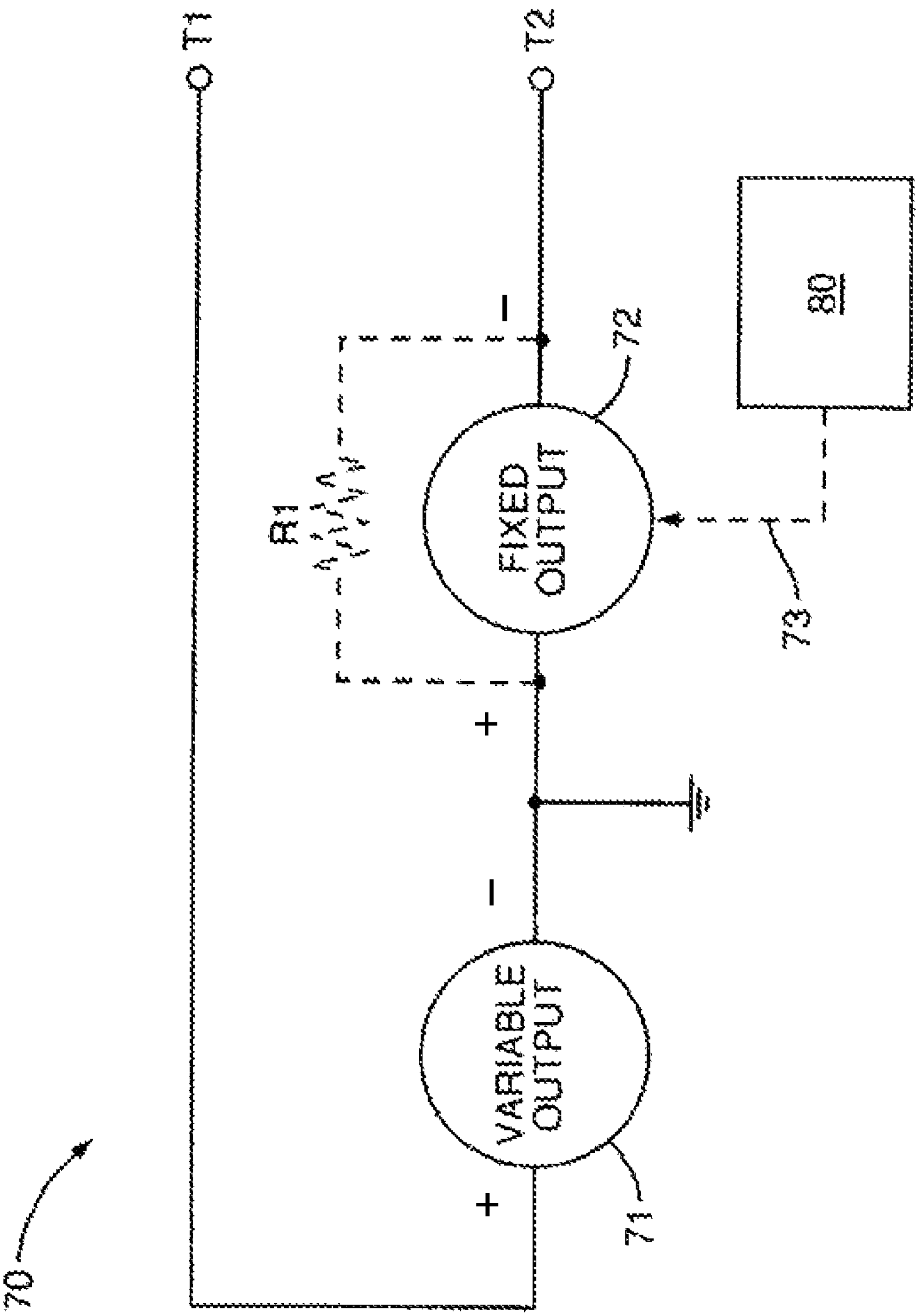
FIG. 3 is an electrical schematic diagram of a power supply according to one embodiment.

In addition to charging the photoconductive unit 12, a charge may be supplied to each of the transfer rollers 20. In one embodiment, the function of the transfer rollers 20 necessitates that the power supply 70 include the capability to output both positive and negative voltages with respect to a system ground. In one embodiment as illustrated in FIG. 3, the power supply 70 includes at least two voltage sources 71, 72 connected in series. It will be obvious to one skilled in the art that the power supply 70 may include more than two voltage sources and that the voltage sources may be connected in configurations other than in series. In order to provide both positive and negative voltages, the voltage sources 71, 72 may have opposite polarities. In this embodiment, voltage source 71 operates at a positive voltage, and voltage source 72 operates at a negative voltage with respect to the system ground. Further, voltage source 71 includes an adjustable output ranging from zero to a predetermined maximum value, and voltage source 72 includes a fixed output at a predetermined value.

The output voltage range of the circuit illustrated in FIG. 3 may vary within a specified range. The most negative voltage output achievable with this circuit is the sum of the output voltage of the fixed voltage source 72 and the variable output source 71 adjusted to its lowest output voltage. The most positive output achievable is the sum of the output voltage of the fixed voltage source 72 and the variable output voltage source 71 adjusted to its highest output voltage. For example, the output voltage of the fixed voltage source 72 may be −500V, and the output voltage of the variable output source 71 may range from 0V-2000V. Thus, the most negative output voltage achievable would be −500V (−500V+0V), and the most positive output voltage achievable would be +1500V (−500V+2000V).

As illustrated in FIG. 3, a modification of the power supply control system may allow an increase in the voltage output of the power supply 70 without requiring a complete redesign. In one embodiment, the print engine controller 80 and the power supply 70 are configured to allow the print engine controller 80 to disable the fixed output voltage source 72 when the voltage demand of a load connected across terminals T1 and T2 exceeds the differential voltage of the power supply. To illustrate the effect of this control system, consider the previous example where the output of the fixed output voltage source 72 is −500V and the maximum output of the variable voltage source 71 is 2000V. If the voltage demand of the load exceeds the differential voltage of the power supply 70 (1500V), then the controller may disable the fixed output voltage source 72. The differential voltage of the power supply 70 now increases to 2000V (0V+2000V). In this embodiment, the power supply 70 is capable of generating only positive voltage when the fixed output voltage source 72 is disabled, and both positive and negative voltage when the fixed output voltage source 72 is enabled. Thus, the control system may allow an increase in output voltage of the existing design without modifications to a basic design of the power supply 70.

There are at least two methods to disable the fixed output voltage source 72. In one embodiment, the fixed output voltage source 72 is shut off. The output voltage when no load is applied across the terminals T1, T2, as described above, is the output voltage of the adjustable voltage source 71. However, when a load is applied, the output voltage is equal to the output voltage of the adjustable voltage source 71 minus a voltage drop across a resistance of the disabled fixed output voltage source 72. As illustrated schematically in FIG. 3, the disabled fixed output voltage source 72 acts as a resistor R1. Due to this voltage drop, the load regulation may be worse than when both of the voltage sources 71, 72 are operating. An advantage of shutting off the fixed output voltage source 72 may be an improvement in HVPS to HVPS transfer voltage accuracy for a given pulse-width modulation and load. Another advantage may be simplicity in implementation.

In another embodiment, the output of the fixed output voltage source 72 is regulated to 0V, rather than shutting off the voltage source 72. This embodiment may allow the fixed output voltage source 72 to overcome the voltage drop from the resistance R1 of the disabled fixed output voltage source 72. However, because both voltage sources 71, 72 affect a net output tolerance, the HVPS to HVPS transfer voltage accuracy for a given pulse-width modulation and load may be worse than with the previous embodiment. Additionally, regulating the output of the fixed output voltage source 72 may require additional control logic not needed with the previous embodiment.

Another consideration when increasing the voltage output of existing circuit designs is maintaining proper creepage and clearance distances. Electrical devices are designed with a separation between conductive components for safety considerations. Among other factors, this electrical isolation is a function of the voltage being carried by the components. In simple terms, the higher the voltage, the greater the required separation between components. This separation may be accomplished by spacing apart the conductive components and/or placing a layer of insulating material over one or more of the components. Breakdown of the electrical isolation may occur through air (clearance) or along a surface (creepage). For example, the surface of insulating materials within an electrical device may become at least partially conductive due to deposits from exposure to chemicals, humidity, and air pollution. Humidity and pollution may increase the conductivity of air surrounding electrical components.

Creepage distance is defined as the distance between two electrical conductors along the surface of an insulating material (e.g., the measured distance takes into account topological features of the insulating material between the conductors). The required creepage distance increases as the voltage carried by the conductors increases. Therefore, minimum creepage distance requirements may be re-evaluated if the voltage stress across terminals T1 and T2 increases when an existing circuit design is modified for another use.

Clearance is defined as the straight line distance between two conductors through air (e.g., the minimum distance through air between the conductors that does not intersect a solid surface). Like creepage, the minimum clearance distance is a function of the voltage carried by the conductors and increases with increasing voltage. As described above, the voltage stress between the terminals T1, T2 is the same before and after implementing the control system, and the clearance distance may not have to be re-evaluated.

As illustrated in FIG. 1, color image forming devices may include four image forming units 50, and each image forming unit 50 includes a transfer roller 20. The power supply 70 may include an output contact for each of the four transfer rollers 20. To reduce cost and complexity of the power supply 70, a negative supply may be common to all four contacts. The power supply 70 including the variable voltage source 71 and the fixed output voltage source 72 may not be able to switch between a first mode where the fixed output voltage source 72 is operative and a second mode where the fixed output voltage source 72 is disabled independently for each transfer roller 20. When the power supply 70 switches between modes, all four of output contacts may be affected simultaneously. Because of the non-independent nature of the output contacts, the voltage stress between the contacts remains the same from existing design, and creepage and clearance distance may not have to be revised.

As used herein, the terms “having”, “containing”, “including”, “comprising”, and the like are open ended terms that indicate the presence of stated elements or features, but do not preclude additional elements or features. The articles “a”, “an” and “the” are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A control system to regulate the output voltage of a high voltage power supply in an image forming device, comprising:

at least two voltage sources connected in series to achieve a potential difference across the at least two voltage sources, each voltage source having two terminals; and a print engine controller configured to selectively set to about zero volts a voltage across the two terminals of one of the voltage sources;

wherein the at least two voltage sources include an adjustable output voltage source and a fixed output voltage source which provides a substantially fixed output voltage, and a voltage across the terminals of the voltage source other than the one of the voltage sources being independent of the voltage across the terminals of the one of the voltage sources being set to about zero volts by the print engine controller.

2. The control system of claim 1, wherein a polarity across the two terminals of the adjustable output voltage source is opposite to a polarity across the two terminals of the fixed output voltage source.

3. The control system of claim 2, wherein the print engine controller is configured to selectively disable the fixed output voltage source when a voltage demand from a load coupled across the at least two voltage sources exceeds a maximum potential difference across the at least two voltage sources.

4. A control system to control the potential difference of a high voltage power supply of an image forming device, the control system comprising:

first and second voltage sources, each having an opposite polarity with respect to a reference voltage level, the potential difference between the two voltage sources comprising a transfer voltage applied to at least one of a plurality of image transfer stations; and a power supply control circuit operative to selectively reduce the voltage of one of the first and second voltage sources to about the reference voltage level to increase the potential difference, wherein the first voltage source is a variable voltage source and the second voltage source is a fixed voltage source which provides a substantially fixed output voltage, wherein a voltage of the first and second voltage source other than the one thereof being independent of the voltage of the one of the first and second voltage sources being reduced to about the reference voltage level by the power supply control circuit.

5. The control system of claim 4, wherein the power supply control circuit is configured to disable the second voltage source to increase the potential difference.

6. The control system of claim 4, wherein each of the first and second voltage sources including two terminals, the reference voltage is a system ground coupled to a terminal of each of the first and second voltage sources, wherein the potential difference of the high voltage power supply comprises the potential across the terminals of the first and second voltage sources not coupled to system ground.

7. The control system of claim 1, wherein a first terminal of the fixed output voltage source is coupled to a first output terminal, a second terminal of the fixed output voltage source is coupled to a first terminal of the adjustable output voltage source and to a ground potential, and a second terminal of the variable output voltage source is coupled to a second output terminal.

8. The control system of claim 7, wherein a voltage level appearing on the second output terminal is greater than a voltage level appearing on the first output terminal.

9. The control system of claim 1, wherein an absolute value of a voltage across the two terminals of the fixed output voltage source is less than an absolute value of a voltage across the two terminals of the adjustable output voltage source.

10. The control system of claim 1, wherein a first output terminal of the control system is coupled to one of the terminals of the fixed output voltage source and a second output terminal of the control system is coupled to one of the terminals of the adjustable output voltage source.

11. The control system of claim 4, wherein the power supply control circuit selectively regulates the second voltage source to provide about a zero volt regulated voltage.

12. An apparatus for supplying a voltage across two output terminals, comprising:

a fixed voltage power supply providing a substantially fixed voltage across a first terminal and a second terminal thereof, the first terminal being coupled to a first of the two output terminals of the apparatus;

an adjustable voltage power supply providing an adjustable voltage across a first terminal and a second terminal thereof, the second terminal of the fixed voltage power supply being coupled to a first terminal of the adjustable voltage power supply and a second terminal of the adjustable voltage power supply being coupled to a second of the two output terminals of the apparatus, the second terminal of the fixed voltage power supply and the first terminal of the adjustable voltage power supply being coupled to a ground potential; and a controller coupled to the fixed voltage power supply for controlling a voltage level of the fixed voltage provided thereby without affecting a voltage level of the adjustable voltage power supply.

13. The apparatus of claim 12, wherein the controller selectively controls the fixed voltage power supply to provide about zero volts across the first and second terminals thereof.

14. The apparatus of claim 12, wherein the controller selectively regulates the fixed voltage power supply to provide about a zero volt regulated voltage across the first and second terminals thereof.

15. The control system of claim 1, wherein the adjustable output voltage source provides a DC voltage that is adjustable.

16. The control system of claim 4, wherein the first voltage source is a DC voltage source providing an adjustable DC voltage.

* * * * *